United States Patent
Shimano et al.

(10) Patent No.: US 11,719,144 B2
(45) Date of Patent: Aug. 8, 2023

(54) EXHAUST GAS PURIFICATION CATALYST

(71) Applicants: Norimichi Shimano, Toyota (JP); Shogo Shirakawa, Toyota (JP); Masahide Miura, Toyota (JP); Isao Chinzei, Toyota (JP); Seiji Nakahigashi, Toyota (JP); Hiroki Nihashi, Kakegawa (JP); Hiromi Togashi, Kakegawa (JP); Tomomasa Aikawa, Kakegawa (JP); Isao Naito, Kakegawa (JP)

(72) Inventors: Norimichi Shimano, Toyota (JP); Shogo Shirakawa, Toyota (JP); Masahide Miura, Toyota (JP); Isao Chinzei, Toyota (JP); Seiji Nakahigashi, Toyota (JP); Hiroki Nihashi, Kakegawa (JP); Hiromi Togashi, Kakegawa (JP); Tomomasa Aikawa, Kakegawa (JP); Isao Naito, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 245 days.

(21) Appl. No.: 17/121,245

(22) Filed: Dec. 14, 2020

(65) Prior Publication Data
US 2021/0199037 A1    Jul. 1, 2021

(30) Foreign Application Priority Data

Dec. 26, 2019 (JP) ................................. 2019-235915

(51) Int. Cl.
| | | |
|---|---|---|
| *F01N 3/10* | (2006.01) | |
| *B01J 23/42* | (2006.01) | |
| *B01J 23/46* | (2006.01) | |
| *B01J 35/00* | (2006.01) | |
| *B01J 35/02* | (2006.01) | |
| *B01J 37/02* | (2006.01) | |

(52) U.S. Cl.
CPC ............. *F01N 3/105* (2013.01); *B01J 23/42* (2013.01); *B01J 23/464* (2013.01); *B01J 35/0006* (2013.01); *B01J 35/023* (2013.01); *B01J 35/026* (2013.01); *B01J 37/0215* (2013.01); *F01N 2370/02* (2013.01); *F01N 2510/0684* (2013.01); *F01N 2570/16* (2013.01)

(58) Field of Classification Search
CPC ......... F01N 3/105; B01J 23/42; B01J 23/464; B01J 35/0006; B01J 35/023; B01J 35/026; B01J 37/0215
See application file for complete search history.

(56) References Cited

U.S. PATENT DOCUMENTS

| | | |
|---|---|---|
| 6,047,544 A | 4/2000 | Yamamoto et al. |
| 8,168,560 B2 | 5/2012 | Taki et al. |
| 8,337,791 B2 | 12/2012 | Kohara et al. |
| 11,426,710 B2 * | 8/2022 | Nishio ..................... B01J 23/63 |
| 2009/0175773 A1 | 7/2009 | Chen et al. |
| 2009/0239745 A1 | 9/2009 | Yamato et al. |
| 2009/0275468 A1 | 11/2009 | Taki et al. |
| 2013/0213000 A1 | 8/2013 | Segawa |
| 2016/0214088 A1 | 7/2016 | Shirakawa et al. |
| 2017/0296968 A1 | 10/2017 | Yoshida et al. |
| 2018/0304238 A1 | 10/2018 | Saito et al. |
| 2019/0120104 A1 | 4/2019 | Inoda et al. |
| 2019/0126248 A1 | 5/2019 | Chinzei et al. |
| 2020/0290019 A1 | 9/2020 | Onoe et al. |
| 2020/0391186 A1 | 12/2020 | Shirakawa et al. |

FOREIGN PATENT DOCUMENTS

| | | |
|---|---|---|
| CN | 105817223 A | 8/2016 |
| CN | 109089414 A | 12/2018 |
| CN | 109745974 A | 5/2019 |
| JP | 2000-051707 A | 2/2000 |
| JP | 2007-038085 A | 2/2007 |
| JP | 2009-273986 A | 11/2009 |
| JP | 2010-234309 A | 10/2010 |
| JP | 2014152306 A * | 8/2014 |
| JP | 2016-147256 A | 8/2016 |
| JP | 2018-176109 A | 11/2018 |
| WO | 2007/040248 A1 | 4/2007 |
| WO | 2009/089151 A1 | 7/2009 |
| WO | 2017/159628 A1 | 9/2017 |
| WO | 2017/179679 A1 | 10/2017 |
| WO | 2020/175142 A1 | 9/2020 |

OTHER PUBLICATIONS

U.S. Appl. No. 17/211,112, filed Mar. 24, 2021.
Non-Final Office Action dated Dec. 24, 2021, issued in U.S. Appl. No. 17/088,767.
Notice of Allowance dated Jun. 9, 2022, issued in U.S. Appl. No. 17/088,767.
Non-Final Office Action dated Dec. 7, 2022, issued in U.S. Appl. No. 17/211,112.
Notice of Allowance dated Feb. 23, 2023, issued in U.S. Appl. No. 17/211,112.

* cited by examiner

*Primary Examiner* — Yong L Chu
(74) *Attorney, Agent, or Firm* — Sughrue Mion, PLLC

(57) ABSTRACT

The present disclosure provides an exhaust gas purification catalyst having improved durability, which comprises a substrate and a catalyst coat layer formed on the substrate, the catalyst coat layer having a two-layer structure, wherein the catalyst coat layer includes an upstream portion on an upstream side and a downstream portion on a downstream side in an exhaust gas flow direction, and a part or all of the upstream portion is formed on a part of the downstream portion, wherein the downstream portion contains Rh fine particles, and wherein the Rh fine particles have an average particle size measured by a transmission electron microscope observation of 1.0 nm or more to 2.0 nm or less, and a standard deviation σ of the particle size of 0.8 nm or less.

4 Claims, 6 Drawing Sheets

EXHAUST GAS PURIFICATION CATALYST

CROSS REFERENCE TO RELATED APPLICATIONS

The present application claims priority from Japanese patent application JP 2019-235915 filed on Dec. 26, 2019, the entire content of which is hereby incorporated by reference into this application.

BACKGROUND

Technical Field

The present disclosure relates to an exhaust gas purification catalyst.

Background Art

An exhaust gas discharged from an internal combustion engine of an automobile and the like contains harmful components, such as carbon monoxide (CO), hydrocarbons (HC), and nitrogen oxides (NOx), and the harmful components are purified by an exhaust gas purification catalyst before discharged into the atmosphere. Conventionally, a three-way catalyst that simultaneously performs oxidation of CO and HC and reduction of NOx is used as the exhaust gas purification catalyst, and a catalyst that uses a noble metal, such as platinum (Pt), palladium (Pd), and rhodium (Rh), as a catalyst metal is widely employed as the three-way catalyst.

Recently, while emission regulations have become stricter, the amount of the noble metals used for the exhaust gas purification catalyst is desired to be reduced from the aspect of the resource risk. Among the noble metals, Rh plays a role in NOx reduction activity, and highly activating Rh provides an expectation of the reduction of the noble metal amount while complying with the emission regulations.

As one method for reducing the usage of the noble metal in the exhaust gas purification catalyst, there has been known a method to use the noble metal by supporting the noble metal as fine particles on a carrier. For example, JP 2016-147256 A discloses a method for manufacturing a catalyst that includes a step of supporting noble metal particles on an oxide carrier to obtain a noble metal supported catalyst and a step of performing a heating process to the noble metal supported catalyst in a reducing atmosphere to control a particle size of the noble metal in a predetermined range. JP 2016-147256 A discloses that the particle sizes of the noble metal particles on the oxide carrier were able to be controlled in a range of 2.8 nm or more to 3.8 nm or less in Examples.

JP 2007-38085 A discloses a method for manufacturing a catalyst that includes a step of causing a reductant to act to a catalyst in which noble metal particles are supported on an oxide carrier, enlarging the noble metal particles having small particle sizes, and obtaining the minimum particle size of the noble metal particles of 1 nm or more. JP 2007-38085 A discloses that the particle sizes of the noble metal particles on the oxide carrier were able to be controlled to 3.0 nm or more to 4.1 nm or less in Examples.

An addition position of a catalyst metal for maximally providing an effect of a catalyst has been examined. For example, JP 2009-273986 A discloses an exhaust gas purification catalyst that includes a catalyst coat layer having a two-layer structure of a lower layer and an upper layer. The lower layer is formed on a surface of a carrier substrate and supports rhodium. The upper layer is formed on a surface of the lower layer and supports at least platinum. The platinum of the upper layer is supported with a concentration increased toward an upstream side of an exhaust gas, and the rhodium of the lower layer is supported with a concentration increased toward a downstream side of the exhaust gas.

However, for the conventional catalyst that uses Rh fine particles whose particle sizes are controlled, the Rh fine particles are aggregated to be deteriorated during the catalytic reaction, thus failing to provide sufficient durability of the catalyst in some cases. Since the improvement of the catalyst durability ensures effective use of Rh, the noble metal amount can be reduced. For the conventional catalyst that uses the Rh fine particles whose particle sizes are controlled, the addition position for maximally providing its effect has not been sufficiently examined.

SUMMARY

As described above, for the conventional exhaust gas purification catalyst that uses the Rh fine particles whose particle sizes are controlled, there is a room for improving the catalyst durability and the addition position for maximally providing its effect. Accordingly, the present disclosure provides an exhaust gas purification catalyst having improved durability.

The inventors examined various means to solve the problem, and found that the use of Rh fine particles in which an average particle size and a standard deviation 6 of the particle size are controlled in specific ranges to a downstream portion of a catalyst coat layer ensures improved durability of an exhaust gas purification catalyst. Thus, the inventors achieved the present disclosure.

That is, the gist of the present disclosure is as follows.
(1) An exhaust gas purification catalyst comprising: a substrate; and a catalyst coat layer formed on the substrate, the catalyst coat layer having a two-layer structure, wherein the catalyst coat layer includes an upstream portion on an upstream side and a downstream portion on a downstream side in an exhaust gas flow direction, and a part or all of the upstream portion is formed on a part of the downstream portion, wherein the downstream portion contains Rh fine particles, and wherein the Rh fine particles have an average particle size measured by a transmission electron microscope observation of 1.0 nm or more to 2.0 nm or less, and a standard deviation σ of the particle size of 0.8 nm or less.
(2) The exhaust gas purification catalyst according to (1), wherein a content of the Rh fine particles in the downstream portion is 0.01 g/L or more to 0.7 g/L or less based on a volume of the substrate.
(3) The exhaust gas purification catalyst according to (1) or (2), wherein the downstream portion further contains an OSC material that has an oxygen storage capacity, and a weight proportion of the OSC material in the downstream portion is 5% by weight or more to 55% by weight or less.
(4) The exhaust gas purification catalyst according to any of (1) to (3), wherein the upstream portion contains Pt as a catalyst metal.

The present disclosure can provide the exhaust gas purification catalyst having the improved durability.

DETAILED DESCRIPTION

The following describes embodiments of the present disclosure in detail.

An exhaust gas purification catalyst of the present disclosure comprises a substrate and a catalyst coat layer formed on the substrate. The catalyst coat layer has a two-layer structure that includes an upstream portion on the upstream side and a downstream portion on the downstream side in an exhaust gas flow direction, and a part or all of the upstream portion is formed on a part of the downstream portion. That is, the downstream portion has a single layer portion not coated with the upstream portion.

Figure 1:
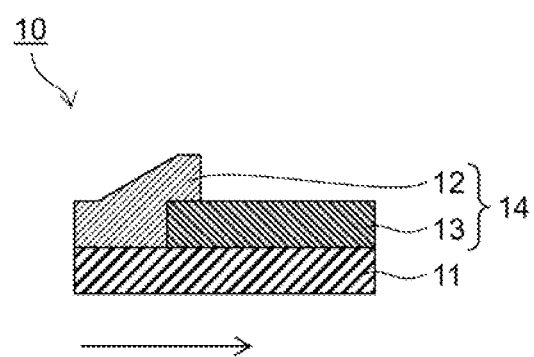
FIG. 1 is a cross-sectional schematic diagram illustrating a first embodiment of an exhaust gas purification catalyst of the present disclosure.

FIG. 1 illustrates a first embodiment of the exhaust gas purification catalyst of the present disclosure. As illustrated in FIG. 1, an exhaust gas purification catalyst 10 comprises a substrate 11 and a catalyst coat layer 14 of a two-layer structure formed on the substrate 11. The catalyst coat layer 14 includes an upstream portion 12 and a downstream portion 13, and a part of the upstream portion 12 is formed on a part of the downstream portion 13. In FIG. 1, an arrow indicates the exhaust gas flow direction. In the exhaust gas purification catalyst having this structure, the exhaust gas passes through the upstream portion 12 at first, thereby purifying a part of harmful components in the exhaust gas in the upstream portion 12. Subsequently, the exhaust gas passes through the downstream portion 13 that contains Rh fine particles. Therefore, the Rh can be effectively used for the NOx purification, thereby ensuring an improved NOx purification ability and a reduced Rh usage of the catalyst.

Here, for the catalyst coat layer, the upstream portion is formed in a predetermined range from an upstream end surface in the exhaust gas flow direction. In the exhaust gas purification catalyst of the present disclosure, since the upstream portion is formed on a part of the downstream portion, the upstream portion is not formed up to a downstream end surface. That is, a coat width of the upstream portion is a length in a range of less than 100% of the entire length of the substrate from the upstream end surface. Meanwhile, the downstream portion only needs to be formed at least from the downstream end surface, and may be formed over the entire length of the substrate. That is, a coat width of the downstream portion is a length in a range of 100% or less of the entire length of the substrate from the downstream end surface. When the downstream portion is formed over the entire length of the substrate, all of the upstream portion is formed on a part of the downstream portion.

Figure 2:
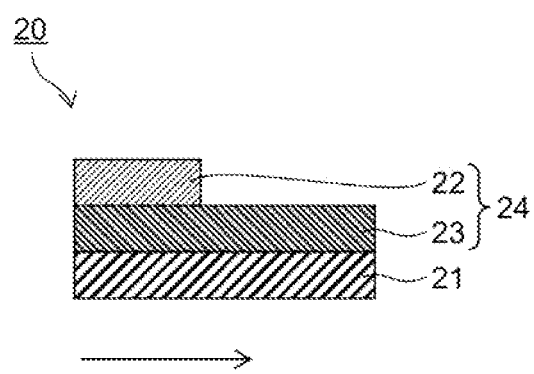
FIG. 2 is a cross-sectional schematic diagram illustrating a second embodiment of the exhaust gas purification catalyst of the present disclosure.

FIG. 2 illustrates a second embodiment of the exhaust gas purification catalyst of the present disclosure. As illustrated in FIG. 2, in an exhaust gas purification catalyst 20, a catalyst coat layer 24 includes an upstream portion 22 and a downstream portion 23 and, all of the upstream portion 22 is formed on a part of the downstream portion 23. In the exhaust gas purification catalyst 20, the downstream portion 23 as a lower layer is formed on a substrate 21, and the upstream portion 22 as an upper layer is formed on a part of the downstream portion 23. In FIG. 2, an arrow indicates the exhaust gas flow direction. Also in the exhaust gas purification catalyst having this structure, similarly to the first embodiment, the exhaust gas passes through the upstream portion 22 as the upper layer at first, thereby purifying a part of harmful components in the exhaust gas in the upstream portion 22. Subsequently, the exhaust gas passes through the downstream portion 23 that contains Rh fine particles. Therefore, the Rh can be effectively used for the NOx purification, thereby ensuring an improved NOx purification ability and a reduced Rh usage of the catalyst.

The coat width of the upstream portion of the catalyst coat layer is a length in a range of 80% or less of the entire length of the substrate from the upstream end surface in some embodiments, or may be 70% or less, or 50% or less. For example, the coat width of the upstream portion may be the length in a range of 40% or less, or 30% or less.

The coat width of the downstream portion of the catalyst coat layer is a length in a range of 100% or less of the entire length of the substrate from the downstream end surface as describe above, and the length in a range of 90% or less, or 80% or less in some embodiments. For example, the coat width of the downstream portion may be the length in a range of 60% or less, or 40% or less. The coat width of the downstream portion of the catalyst coat layer is the length in a range of 60% or more to 100% or less of the entire length of the substrate from the downstream end surface in some embodiments.

In the catalyst coat layer of the exhaust gas purification catalyst of the present disclosure, a part or all of the upstream portion overlaps a part of the downstream portion. A width of the portion in which the upstream portion overlaps the downstream portion is a length in a range of 10% or more to 60% or less of the entire length of the substrate in some embodiments, or may be 10% or more to 40% or less.

The substrate used for the exhaust gas purification catalyst of the present disclosure is not specifically limited, and a generally used material in a honeycomb shape having multiple cells can be used. The material of the substrate includes a ceramic material having heat resistance, such as cordierite ($2MgO \cdot 2Al_2O_3 \cdot 5SiO_2$), alumina, zirconia, and silicon carbide, and a metal material formed of a metal foil, such as a stainless steel. From the aspect of cost, the cordierite is used in some embodiments.

The downstream portion of the catalyst coat layer contains rhodium (Rh) fine particles (hereinafter also referred to as particle size-controlled Rh fine particles or Rh fine particles), whose average particle size and standard deviation σ of the particle size are controlled to specific ranges. Because of the relatively small average particle size, the particle size-controlled Rh fine particles have a significantly large specific surface area, thus having a high catalytic activity. Since the particle size-controlled Rh fine particles have a narrow particle size distribution and low proportions of coarse particles and fine particles, the particle size-controlled Rh fine particles have high durability and high catalytic activity. By the use of the particle size-controlled Rh fine particles to the downstream portion of the catalyst coat layer, the Rh can be effectively used for the NOx purification, thereby ensuring the improved NOx purification ability and the reduced Rh usage of the catalyst.

The Rh fine particles have the average particle size of 1.0 nm or more to 2.0 nm or less. In the present disclosure, the average particle size of the Rh fine particles is a number average particle size obtained by directly measuring projected area equivalent diameters based on an image taken in an observation with a transmission electron microscope (TEM) and analyzing particle groups having a cardinal number of 100 or more.

By controlling the average particle size of the Rh fine particles to 1.0 nm or more, the proportion of fine particles having the particle size of less than 1.0 nm, which are considered to be aggregated to cause coarsening during a catalytic reaction, can be reduced. Therefore, the deterioration of the Rh fine particles can be suppressed, thus ensuring the improved catalyst durability. Meanwhile, by controlling the average particle size of the Rh fine particles to 2.0 nm or less, the surface areas of the Rh fine particles can be increased, thus ensuring the improved catalytic activity. The average particle size of the Rh fine particles is 1.1 nm or more in some embodiments, or may be 1.2 nm or more. The average particle size of the Rh fine particles is 1.9 nm or less in some embodiments, or may be 1.8 nm or less or 1.6 nm or less. The average particle size of the Rh fine particles is 1.1 nm or more to 1.9 nm or less in some embodiments, or may be 1.2 nm or more to 1.8 nm or less.

The Rh fine particles have a standard deviation σ of the particle size, which is measured by the transmission electron microscope observation, of 0.8 nm or less. Since the Rh fine particles have the standard deviation σ of the particle size of 0.8 nm or less, the particle size distribution is sharp, and the proportions of the fine particles and the coarse particles are low. Because of the small number of the fine particles, the aggregation of the Rh fine particles during the catalytic reaction is suppressed, thereby suppressing the deterioration of Rh and improving the catalyst durability. Because of the small number of the coarse particles, the surface areas of the Rh fine particles are increased, thereby improving the catalytic activity.

The standard deviation σ of the particle size of the Rh fine particles is 0.7 nm or less in some embodiments, or may be 0.6 nm or less or 0.5 nm or less. While the particle sizes of the Rh fine particles may be monodispersed, the effects of the disclosure can be provided even when the standard deviation σ is 0.2 nm or more, 0.3 nm or more, or 0.4 nm or more.

For the Rh fine particles, the proportion of the fine particles having the particle size of less than 1.0 nm is especially reduced. Because of the small proportion of the fine particles having the particle size of less than 1.0 nm, the aggregation of the Rh fine particles during the catalytic reaction is suppressed, thereby suppressing the deterioration of Rh and improving the catalyst durability. For the Rh fine particles, the proportion of the Rh fine particles having the particle size of less than 1.0 nm is 5% by weight or less based on the total weight of the Rh fine particles in some embodiments. This value may be 4% by weight or less, 3% by weight or less, 2% by weight or less, 1% by weight or less, 0.5% by weight or less, 0.3% by weight or less, or 0.1% by weight or less. The Rh fine particles having the particle size of less than 1.0 nm does not have to be contained at all.

In some embodiments, the Rh fine particles have the average particle size of 1.2 nm or more to 1.8 nm or less in the measurement by the transmission electron microscope, and the proportion of the Rh fine particles having the particle size of less than 1.0 nm is 5.0% by weight or less based on the total weight of the Rh fine particles.

The Rh fine particles are supported on carrier particles in some embodiments. The carrier particles are not specifically limited, and for example, oxide carrier particles can be used. As the supporting method, a common supporting method, such as an impregnation supporting method, an adsorption supporting method, and a water-absorption supporting method, can be used.

As the oxide carrier particles, for example, particles of a metal oxide can be used. The metal contained in the metal oxide includes, for example, one or more metals selected from group 3, group 4, and group 13 of the periodic table and a lanthanoid-based metal. When the oxide carrier particles contain two or more metal oxides, it may be any of a mixture of two or more metal oxides, a composite oxide containing two or more metals, or a mixture of one or more metal oxides and one or more composite oxides.

The metal oxide may be the oxide of one or more metals selected from, for example, scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), or the oxide of one or more metals selected from Y, La, Ce, Ti, Zr, and Al in some embodiments. As the metal oxide, a composite oxide of yttria ($Y_2O_3$), lanthana ($La_2O_3$), and zirconia ($ZrO_2$) is used in some embodiments.

The particle size of the carrier particles may be appropriately set by those skilled in the art depending on the purpose.

When the Rh fine particles supported on the carrier particles are used, the support amount of the Rh fine particles is, for example, 5% by weight or less, 3% by weight or less, 1% by weight or less, 0.7% by weight or less, 0.5% by weight or less, 0.3% by weight or less, or 0.2% by weight or less based on the weight of the carrier particles. The support amount of the Rh fine particles is, for example, 0.01% by weight or more, 0.02% by weight or more, 0.05% by weight or more, 0.07% by weight or more, 0.1% by weight or more, 0.2% by weight or more, 0.5% by weight or more, or 1% by weight or more based on the weight of the carrier particles.

When the Rh fine particles supported on the carrier particles are used, the Rh-supported catalyst particles can be manufactured by bringing the carrier particles into contact with a Rh fine particle precursor dispersion, which contains Rh fine particle precursors preliminarily controlled to a predetermined particle size distribution, and subsequently performing calcination.

The Rh fine particle precursor dispersion can be manufactured by, for example, any of the following methods.

(1) a method (Method 1) that causes an acidic solution of a Rh compound to react with a basic solution in a reactor in which a clearance of a reaction field is set to a predetermined range; and (2) a method (Method 2) that mixes the acidic solution of the Rh compound with the basic solution to react and subsequently performs a stirring treatment in a high speed mixer.

In Method 1, by the use of the reactor in which the clearance of the reaction field is set to the predetermined range when causing the acidic solution of the Rh compound (for example, inorganic acid salt of Rh) to react with the basic solution (for example, aqueous solution of nitrogen-containing organic compound), the particle size and the particle size distribution of the Rh fine particle precursors (for example, hydroxides of Rh) contained in the obtained dispersion can be controlled.

Clearance adjustment members included in the reactor may be two flat plates, a combination of a flat plate and a wave-shaped plate, narrow tubes, and the like. The clearance of the reaction field can be appropriately set corresponding to a desired particle size and a desired particle size distribution. As the reactor in which the clearance of the reaction field is set to the predetermined range, for example, a micro reactor that includes an appropriate clearance adjustment member is usable.

In Method 2, the acidic solution of the Rh compound (for example, inorganic acid salt of Rh) is reacted with the basic solution (for example, aqueous solution of nitrogen-containing organic compound) to generate the Rh fine particle precursors as particles having large particle sizes, the stirring treatment of the Rh fine particle precursors is performed in the high speed mixer, and a strong shearing force is applied to disperse the Rh fine particle precursors, thereby controlling the average particle size and the particle size distribution of the dispersed Rh fine particle precursors.

The Rh-supported catalyst particles can be obtained by bringing the Rh fine particle precursor dispersion prepared as described above into contact with the carrier particles and subsequently performing the calcination.

The content of the Rh fine particles in the downstream portion of the catalyst coat layer is 0.01 g/L or more to 0.7 g/L or less based on the volume of the substrate in some embodiments, or may be 0.1 g/L or more to 0.5 g/L or less. When the content of the Rh fine particles in the downstream portion is 0.01 g/L or more to 0.7 g/L or less, the improved catalyst durability and the reduced Rh usage can be provided at the same time.

When the Rh fine particles supported on the carrier particles are used as the Rh-supported catalyst particles, the content of the Rh-supported catalyst particles in the downstream portion of the catalyst coat layer is 10 g/L or more to 80 g/L or less based on the volume of the substrate in some embodiments, or may be 20 g/L or more to 60 g/L or less.

The downstream portion of the catalyst coat layer may contain an OSC material that has an oxygen storage capacity. The OSC material is an inorganic material having the oxygen storage capacity. The OSC material stores oxygen when a lean exhaust gas is supplied and releases the stored oxygen when a rich exhaust gas is supplied. The OSC material is not specifically limited, and includes cerium oxide (ceria: $CeO_2$), a composite oxide containing the ceria (for example, ceria-zirconia ($ZrO_2$) composite oxide (CZ composite oxide or ZC composite oxide)), and the like. Among the above-described OSC materials, the ceria-zirconia composite oxide is used in some embodiments because of the high oxygen storage capacity and the relatively low price. The ceria-zirconia composite oxide may be used in a form of a composite oxide with lanthana ($La_2O_3$), yttria ($Y_2O_3$), and the like. The mixture ratio of ceria to zirconia in the ceria-zirconia composite oxide is $CeO_2/ZrO_2$=0.2 or more to 9.0 or less in some embodiments.

When the downstream portion of the catalyst coat layer contains the OSC material, its content is 5% by weight or more to 55% by weight or less based on the weight of the downstream portion in some embodiments, or may be 10% by weight or more to 50% by weight or less. When the OSC material content in the downstream portion is 5% by weight or more to 55% by weight or less, the catalyst durability can be effectively improved.

When the downstream portion of the catalyst coat layer contains the OSC material, its content is 5 g/L or more to 75 g/L or less based on the volume of the substrate in some embodiments, or may be 10 g/L or more to 60 g/L or less. When the OSC material content in the downstream portion is 5 g/L or more to 75 g/L or less based on the volume of the substrate, the catalyst durability can be effectively improved.

The downstream portion of the catalyst coat layer may contain any other component in addition to the particle size-controlled Rh fine particles and the OSC material. The other component is not specifically limited and includes a metal oxide and the like. When the downstream portion of the catalyst coat layer contains the other component, its content is 80 g/L or less based on the volume of the substrate in some embodiments, or may be 60 g/L or less.

The metal oxide is not specifically limited, and may be the oxides of one or more metals selected from, for example, scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al). As the metal oxide, alumina ($Al_2O_3$) or a composite oxide of $Al_2O_3$ and lanthana ($La_2O_3$) is used in some embodiments.

The upstream portion of the catalyst coat layer contains a platinum group noble metal as a catalyst metal in some embodiments. The platinum group noble metal includes ruthenium (Ru), palladium (Pd), osmium (Os), iridium (Ir), and platinum (Pt), and Pt is used in some embodiments. When the upstream portion of the catalyst coat layer contains Pt as the catalyst metal, HC can be converted in the upstream portion through which the exhaust gas passes at first, and NOx can be converted in the state of suppressing an influence of HC poisoning in the downstream portion that contains the particle size-controlled Rh fine particles. Accordingly, the Rh can be effectively used for the NOx purification, thereby ensuring the improved NOx purification ability and the reduced Rh usage of the catalyst.

The catalyst metal may be supported on the carrier particles for use. The carrier particles are not specifically limited, and for example, oxide carrier particles can be used. As the supporting method, a common supporting method, such as an impregnation supporting method, an adsorption supporting method, and a water-absorption supporting method, can be used.

As the oxide carrier particles, for example, particles of a metal oxide can be used. The metal contained in the metal oxide includes, for example, one or more metals selected from group 3, group 4, and group 13 of the periodic table and a lanthanoid-based metal. When the oxide carrier particles contain two or more metal oxides, it may be any of a mixture of two or more metal oxides, a composite oxide containing two or more metals, or a mixture of one or more metal oxides and one or more composite oxides.

The metal oxide may be the oxides of one or more metals selected from, for example, scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), or the oxides of one or more metals selected from Y, La, Ce, Ti, Zr, and Al in some embodiments. As the metal oxide, alumina ($Al_2O_3$) or a composite oxide of $Al_2O_3$ and lanthana ($La_2O_3$) is used in some embodiments.

The content of the catalyst metal in the upstream portion of the catalyst coat layer is 0.01 g/L or more to 1 g/L or less based on the volume of the substrate in some embodiments, or may be 0.1 g/L or more to 0.6 g/L or less. When the content of the catalyst metal in the upstream portion is 0.01 g/L or more to 1 g/L or less, HC is sufficiently converted in the upstream portion, thus ensuring the NOx purification in the state of suppressing the influence of HC poisoning in the downstream portion.

When the catalyst metal is supported on the carrier particles to be used as the supported catalyst particles, the content of the supported catalyst particles in the upstream portion is 1 g/L or more to 50 g/L or less based on the volume of the substrate in some embodiments, or may be 10 g/L or more to 30 g/L or less.

The upstream portion of the catalyst coat layer may contain any other component in addition to the catalyst metal. The other component is not specifically limited and includes an OSC material and the like. When the upstream portion of the catalyst coat layer contains the other component, its content is 80 g/L or less based on the volume of the substrate in some embodiments, or may be 60 g/L or less or 40 g/L or less.

The OSC material is not specifically limited, and includes cerium oxide (ceria: $CeO_2$), a composite oxide containing the ceria (for example, ceria-zirconia ($ZrO_2$) composite oxide (CZ composite oxide or ZC composite oxide)), and the like. Among the above-described OSC materials, the ceria-zirconia composite oxide is used in some embodiments because of the high oxygen storage capacity and the relatively low price. The ceria-zirconia composite oxide may be used in a form of a composite oxide with lanthana ($La_2O_3$), yttria ($Y_2O_3$), and the like. The mixture ratio of ceria to zirconia in the ceria-zirconia composite oxide is $CeO_2/ZrO_2=0.2$ or more to 9.0 or less in some embodiments.

The exhaust gas purification catalyst of the present disclosure can be produced by coating the substrate with a slurry containing the components of the catalyst coat layer by a method known to those skilled in the art. In one embodiment, for example, a predetermined range is coated with a slurry containing particle size-controlled Rh fine particles, an OSC material and a metal oxide from a downstream end surface of a substrate using a known method, and drying and calcining are performed at a predetermined temperature for a predetermined time period, thus forming a downstream portion of a catalyst coat layer on the substrate. Subsequently, a predetermined range is coated with a slurry containing a catalyst metal, such as Pt, and an OSC material from an upstream end surface of the substrate using a known method, and drying and calcining are performed at a predetermined temperature for a predetermined time period, thus forming an upstream portion.

EXAMPLES

The following further specifically describes the present disclosure using Examples. However, the technical scope of the present disclosure is not limited to Examples.

<Confirmation of Effects of Particle Size-Controlled Rh Fine Particles and Examination of Addition Position>

1. Preparation of Catalysts

Used Raw Material

Material 1: $Al_2O_3$: 4% by weight-$La_2O_3$ composite $Al_2O_3$
Material 2: ZY: 84% by weight-$ZrO_2$, 6% by weight-$La_2O_3$, 10% by weight-$Y_2O_3$ composite oxide
Material 3: Pt/$Al_2O_3$: material in which Pt is supported on the material 1
Material 4: particle size-controlled Rh dispersion
Material 5: Rh/ZY: material in which Rh is supported on the material 2
Material 6: particle size-controlled Rh/ZY: material in which Rh of the material 4 is supported on the material 2
Material 7: beaker method Rh dispersion
Material 8: beaker method Rh/ZY: material in which Rh of the material 7 is supported on the material 2
Material 9: ZC (OSC material): 21% by weight-$CeO_2$, 72% by weight-$ZrO_2$, 1.7% by weight-$La_2O_3$, 5.3% by weight-$Y_2O_3$ composite oxide
Substrate: cordierite honeycomb substrate of 875 cc (400 cells square, wall thickness 4 mil)

The material 3 to the material 8 were prepared as follows.

Material 3: Pt/$Al_2O_3$

A Pt nitrate solution was contacted with the material 1, and subsequently calcination was performed, thereby obtaining the material 3 in which Pt was supported on the material 1 in the support amount of 1.0% by weight.

Material 4: Particle Size-Controlled Rh Dispersion 0.2 g of Rh (III) nitrate of was added in 50 mL of ion exchanged water and dissolved, thereby preparing an acidic solution (pH 1.0) of the Rh compound.

An aqueous tetraethylammonium hydroxide solution (concentration 175 g/L, pH 14) was prepared as an organic base solution.

Using a reactor (micro reactor) that included two flat plates as the clearance adjustment members, with a method of introducing the acidic solution of the Rh compound and the organic base solution into a reaction field in which the clearance was set to 10 μm, both liquids were reacted under a condition in which a mole ratio (TEAH/RN) of tetraethylammonium hydroxide (TEAH) to Rh nitrate (RN) was 18 to prepare a Rh fine particle precursor dispersion. The obtained Rh fine particle precursor dispersion had pH 14. The median diameter (D50) of the Rh fine particle precursors contained in the obtained Rh fine particle precursor dispersion was measured by a dynamic light scattering method (DLS), and the median diameter (D50) was 2.0 nm.

Material 5: Rh/ZY

A Rh nitrate solution was contacted with the material 2, and subsequently calcination was performed, thereby obtaining the material 5 in which Rh was supported on the material 2 in the support amount of 0.45% by weight. The average particle size of the Rh fine particles measured by a transmission electron microscope was 0.70 nm.

Material 6: Particle Size-Controlled Rh/ZY

The material 4 was contacted with the material 2, and subsequently calcination was performed, thereby obtaining the material 6 in which Rh was supported on the material 2 in the support amount of 0.45% by weight. The average particle size of the Rh fine particles measured by the transmission electron microscope was 1.40 nm, and the standard deviation σ of the particle size was 0.48 nm. In the particle size distribution of the particle size-controlled Rh, the proportion of fine particles having the particle size of less than 1.0 nm was smaller than that of the beaker method Rh of the material 8.

Material 7: Beaker Method Rh Dispersion

The material 7 was prepared similarly to the preparation of the material 4 except that the acidic solution of the Rh compound was reacted with the organic base solution in a beaker without using the reactor that included the clearance adjustment members.

Material 8: beaker method Rh/ZY

The material 8 in which Rh of the material 7 was supported on the material 2 was prepared similarly to the preparation of the material 6. The average particle size of the Rh fine particles measured by the transmission electron microscope was 1.42 nm, and the standard deviation σ of the particle size was 0.94 nm.

Example 1

The material 6, the material 1, the material 9, and an $Al_2O_3$-based binder were added to distilled water while stirring them, and a slurry 1 in which these materials were suspended was prepared. Subsequently, the prepared slurry 1 was poured into a substrate from a downstream end surface, and an unnecessary portion was blown off by a blower, thus coating a wall surface of the substrate with the materials. The coat width was adjusted to 80% of the entire length of the substrate from the downstream end surface. The coat amount was adjusted such that the material 6 was 40 g/L, the material 1 was 40 g/L, and the material 9 was 35 g/L based on the volume of the substrate. Finally, drying was performed by a dryer at 120° C. for two hours, and subsequently, calcination was performed by an electric furnace at 500° C. for two hours, thus preparing a downstream portion of a catalyst coat layer.

Similarly, the material 3, the material 9, and the $Al_2O_3$-based binder were added to distilled water while stirring them, and a slurry 2 in which these materials were suspended was prepared. The slurry 2 was poured into the substrate, on which the downstream portion was formed, from an upstream end surface, and an unnecessary portion was blown off by the blower, thus coating the wall surface of the substrate with the materials. The coat width was adjusted to 40% of the entire length of the substrate from the upstream end surface. The coat amount was adjusted such that the material 3 was 20 g/L and the material 9 was 30 g/L based on the volume of the substrate. Finally, drying was performed by the dryer at 120° C. for two hours, and subsequently, calcination was performed by the electric furnace at 500° C. for two hours, thus preparing an upstream portion of the catalyst coat layer.

Comparative Example 1

The slurry 2 used in Example 1 was poured into the substrate from the downstream end surface, and an unnecessary portion was blown off by the blower, thus coating a wall surface of the substrate with the materials. The coat width was adjusted to 80%. The coat amount was adjusted such that the material 3 was 40 g/L and the material 9 was 60 g/L based on the volume of the substrate. Finally, drying was performed by the dryer at 120° C. for two hours, and subsequently, calcination was performed by the electric furnace at 500° C. for two hours, thus preparing the downstream portion of the catalyst coat layer.

Similarly, the slurry 1 used in Example 1 was poured into the substrate, on which the downstream portion was formed, from the upstream end surface, and an unnecessary portion was blown off by the blower, thus coating the wall surface of the substrate with the materials. The coat width was adjusted to 40%. The coat amount was adjusted such that the material 6 was 20 g/L, the material 1 was 20 g/L, and the material 9 was 15 g/L based on the volume of the substrate. Finally, drying was performed by the dryer at 120° C. for two hours, and subsequently, calcination was performed by the electric furnace at 500° C. for two hours, thus preparing the upstream portion of the catalyst coat layer.

Comparative Example 2

The catalyst of Comparative Example 2 was prepared similarly to the Comparative Example 1 except that the material 6 was substituted with the material 5.

Comparative Example 3

The catalyst of Comparative Example 3 was prepared similarly to Example 1 except that the material 6 was substituted with the material 5.

Comparative Example 4

The catalyst of Comparative Example 4 was prepared similarly to Example 1 except that the material 6 was substituted with the material 8.

Table 1 indicates compositions and noble metal amounts in the upstream portion and the downstream portion of the catalysts of Example 1 and Comparative Examples 1 to 4. The noble metal amount is a noble metal amount (g/substrate 1 L) to the volume of the substrate.

TABLE 1

| | Upstream portion | | | Downstream portion | | |
|---|---|---|---|---|---|---|
| | Used material | Material composition | Noble metal amount (g/L) | Used material | Material composition | Noble metal amount (g/L) |
| Example 1 | Material 3<br>Material 9 | Pt/$Al_2O_3$<br>Zc | Pt 0.4 | Material 6<br>Material 1<br>Material 9 | Particle size-controlled Rh/ZY<br>$Al_2O_3$<br>ZC | Rh 0.12 |
| Example 2 | Material 3<br>Material 9 | Pt/$Al_2O_3$<br>Zc | Pt 0.4 | Material 6<br>Material 1<br>Material 9 | Particle size-controlled Rh/ZY<br>$Al_2O_3$<br>ZC | Rh 0.36 |
| Exampie 3 | Material 3<br>Material 9 | Pt/$Al_2O_3$<br>ZC | Pt 0.4 | Material 6<br>Material 1<br>Material 9 | Particle size-controlled Rh/ZY<br>$Al_2O_3$<br>ZC | Rh 0.48 |
| Comparative Example 1 | Material 6<br>Material 1<br>Material 9 | Particle size-controlled Rh/ZY<br>$Al_2O_3$<br>ZC | Rh 0.12 | Material 3<br>Material 9 | Pt/$Al_2O_3$<br>ZC | Pt 0.4 |
| Comparative Example 2 | Material 5<br>Material 1<br>Material 9 | Rh/ZY<br>$Al_2O_3$<br>ZC | Rh 0.12 | Material 3<br>Material 9 | Pt/$Al_2O_3$<br>ZC | Pt 0.4 |
| Comparative Example 3 | Material 3<br>Material 9 | Pt/$Al_2O_3$<br>Zc | Pt 0.4 | Material 5<br>Material 1<br>Material 9 | Rh/ZY<br>$Al_2O_3$<br>ZC | Rh 0.2 |
| Comparative Example 4 | Material 3<br>Material 9 | Pt/$Al_2O_3$<br>Zc | Pt 0.4 | Material 8<br>Material 1<br>Material 9 | Beaker method Rh/ZY<br>$Al_2O_3$<br>ZC | Rh 0.12 |

TABLE 1-continued

| | Upstream portion | | | Downstream portion | | |
|---|---|---|---|---|---|---|
| | Used material | Material composition | Noble metal amount (g/L) | Used material | Material composition | Noble metal amount (g/L) |
| Comparative Example 5 | Material 3 Material 9 | Pt/Al$_2$O$_3$ Zc | Pt 0.4 | Material 5 Material 1 Material 9 | Rh/ZY Al$_2$O$_3$ ZC | Rh 0.36 |
| Comparative Example 6 | Material 3 Material 9 | Pt/Al$_2$O$_3$ Zc | Pt 0.4 | Material 5 Material 1 Material 9 | Rh/ZY Al$_2$O$_3$ ZC | Rh 0.48 |

2. Durability Test

The durability test was performed for each of the prepared catalysts using an actual engine. Specifically, the durability test was performed as follows. The catalysts were each installed to an exhaust system of a V-type eight-cylinder engine, exhaust gases in respective stoichiometric and lean atmospheres were repeatedly flown for a certain period of time (a ratio of 3:1) at a catalyst bed temperature of 900° C. for 46 hours.

3. Performance Evaluation

Figure 3:
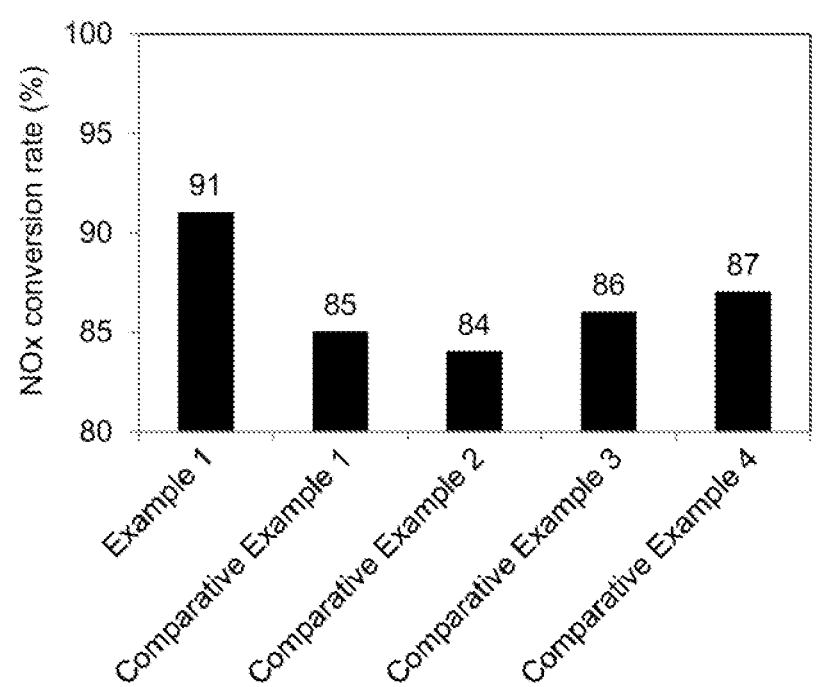
FIG. 3 is a graph illustrating NOx conversion rates in rich atmosphere for catalysts of Example 1 and Comparative Examples 1 to 4.

The exhaust gases having air-fuel ratios (A/F) 14.1 and 15.1 were alternately supplied at the catalyst bed temperature of 500° C. while switching every three minutes, and the NOx conversion rate at Ga=30 g/s was evaluated. The NOx conversion rate in rich atmosphere was calculated by averaging the NOx conversion rates in 15 seconds from a time point after a lapse of two minutes and 45 seconds in the rich (A/F=14.1) of the third switching. Table 2 indicates the details of the catalysts of Example 1 and Comparative Examples 1 to 4. FIG. 3 illustrates the NOx conversion rates in the rich atmosphere for the catalysts of Example 1 and Comparative Examples 1 to 4.

TABLE 2

| | Rh addition position | Rh fine particles | Rh fine particles Average particle size (nm) | Rh fine particles Standard deviation σ (nm) |
|---|---|---|---|---|
| Example 1 | Downstream portion | Material 6 | 1.40 | 0.48 |
| Comparative Example 1 | Upstream portion | Material 6 | 1.40 | 0.48 |
| Comparative Example 2 | Upstream portion | Material 5 | 0.70 | — |
| Comparative Example 3 | Downstream portion | Material 5 | 0.70 | — |
| Comparative Example 4 | Downstream portion | Material 8 | 1.42 | 0.94 |

From FIG. 3, in the comparison between Example 1 and Comparative Example 1, the catalyst of Example 1, in which the downstream portion contains the particle size-controlled Rh fine particles whose average particle size and the standard deviation σ of the particle size were controlled to specific ranges of the present disclosure, had the NOx conversion rate significantly high compared with the catalyst of Comparative Example 1 in which the upstream portion contained the particle size-controlled Rh fine particles. It is considered that this is because HC in the exhaust gas can be converted in the upstream portion through which the exhaust gas passes at first, and NOx in the exhaust gas can be converted by Rh in the state of suppressing an influence of HC poisoning in the downstream portion through which the exhaust gas passes after the upstream portion. The increase range of the NOx conversion rate of Example 1 relative to Comparative Example 1 was larger than the increase range of the NOx conversion rate of Comparative Example 3 relative to Comparative Example 2 in which the average particle sizes of the Rh fine particles were out of the predetermined range of the present disclosure. Accordingly, it can be said that the effect of improving the NOx conversion ability is an effect specifically obtained by adding the particle size-controlled Rh fine particles to the downstream portion. In the comparison between Example 1 and Comparative Examples 3, 4, it is shown that the NOx conversion rate is significantly increased by controlling the average particle size and the standard deviation σ of the particle size of the Rh fine particles within the specific range of the present disclosure. Here, when the average particle sizes of the Rh fine particles were equivalent in the comparison between Example 1 and Comparative Example 4, the NOx conversion rate of the catalyst of Example 1, whose standard deviation σ of the particle size of the Rh fine particles was smaller, was significantly higher than that of the catalyst of Comparative Example 4. It is considered that this is because the Rh fine particles used for the catalyst of Example 1 has the small standard deviation σ, and the particle size is more uniformed.

<Influence of Addition Amount of Rh Fine Particles of Downstream Portion on NOx Conversion Rate>

Examples 2 and 3

The catalysts of Examples 2 and 3 were prepared similarly to Example 1 except that the support amount of the particle size-controlled Rh was changed as indicated in Table 1.

Comparative Examples 5 and 6

The catalysts of Comparative Examples 5 and 6 were prepared similarly to Comparative Example 3 except that the Rh support amount was changed as indicated in Table 1.

Figure 4:
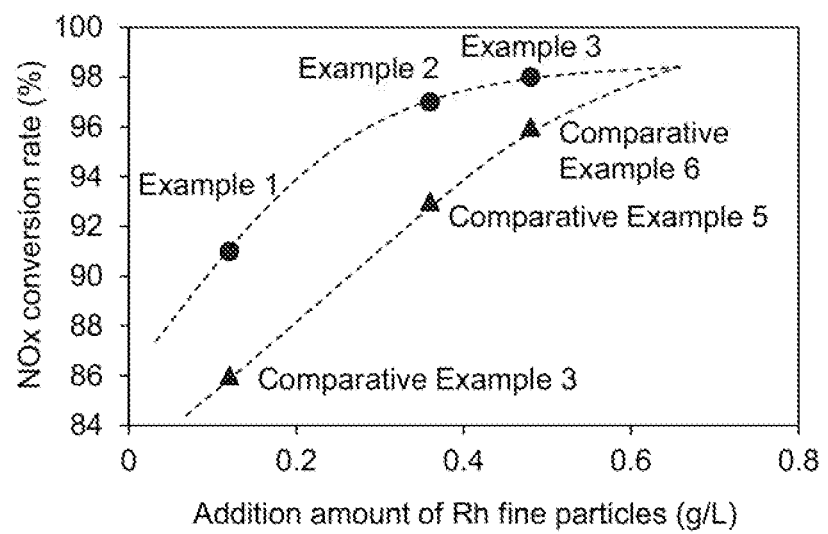
FIG. 4 is a graph illustrating a relation between an addition amount of Rh fine particles in a downstream portion and the NOx conversion rate in the rich atmosphere.

For the catalysts of Examples 1 to 3 and Comparative Examples 3, 5, and 6, the NOx conversion rates were measured similarly to the above-described measurement. Table 1 indicates compositions and noble metal amounts in the upstream portion and the downstream portion of the catalysts of Examples 1 to 3 and Comparative Examples 3, 5, and 6. FIG. 4 illustrates a relation between the addition amount of the Rh fine particles in the downstream portion and the NOx conversion rate in the rich atmosphere.

As illustrated in FIG. 4, the NOx conversion rates of the catalysts of Examples 1 to 3, in which the particle size-controlled Rh fine particles were used, were significantly high compared with the catalysts of Comparative Examples 3, 5, and 6 whose average particle sizes of the Rh fine particles were out of the predetermined range of the present disclosure. The increase of the addition amount of the Rh fine particles in the downstream portion increases the amount of the Rh fine particles as the catalyst metal, thus improving the activity of the catalyst. Therefore, the contribution of the particle size-controlled Rh fine particles to the improvement of the NOx purification ability was decreased. Accordingly, the catalyst using the particle size-controlled Rh fine particles has an intended range of its addition amount from a perspective of improving the NOx purification ability, and the addition amount of the particle size-controlled Rh fine particles is in a range of 0.01 g/L or more to 0.7 g/L or less in some embodiments.

<Influence of OSC Material Content in Downstream Portion on NOx Conversion Rate>

1. Preparation of Catalysts

Examples 4 to 6

The catalysts of Examples 4 to 6 were prepared similarly to Example 1 except that the coat amounts of the material 1, the material 6, and the material 9 in the downstream portion were changed as indicated in Table 3.

Comparative Examples 7, 9, and 10

The catalysts of Comparative Examples 7, 9, and 10 were prepared similarly to Comparative Example 3 except that the coat amounts of the material 1, the material 5, and the material 9 in the downstream portion were changed as indicated in Table 3.

Comparative Example 8

The catalyst of Comparative Example 8 was prepared similarly to Comparative Example 7 except that the material 5 was substituted with the material 8.

2. Durability Test

The durability test was performed for each of the prepared catalysts using an actual engine. Specifically, the durability test was performed as follows. The catalysts were each installed to an exhaust system of a V-type eight-cylinder engine, exhaust gases in respective stoichiometric and lean atmospheres were repeatedly flown for a certain period of time (a ratio of 3:1) at a catalyst bed temperature of 900° C. for 50 hours.

3. Performance Evaluation

The exhaust gases having air-fuel ratios (A/F) 14.1 and 15.1 were alternately supplied at the catalyst bed temperature of 500° C. while switching every three minutes, and the NOx conversion rate at Ga=30 g/s was evaluated. The NOx conversion rate in rich atmosphere was calculated by averaging the NOx conversion rates in 10 seconds from a time point after a lapse of 2 minutes and 45 seconds in the rich (A/F=14.1) of the fourth switching.

Figure 5:
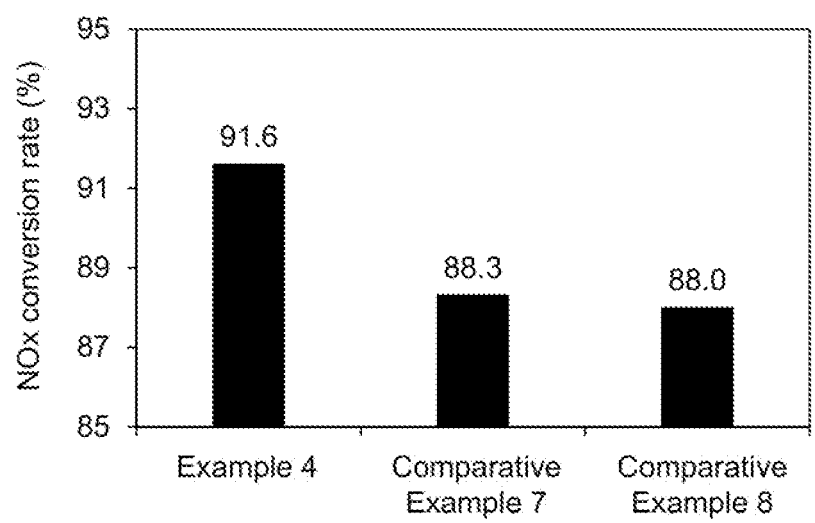
FIG. 5 is a graph illustrating NOx conversion rates in the rich atmosphere for catalysts of Example 4 and Comparative Examples 7 and 8.

Table 3 indicates the details of the catalysts of Examples 4 to 6 and Comparative Examples 7 to 10, and Table 4 indicates the details of the Rh fine particles of the catalysts of Example 4 and Comparative Examples 7, 8. FIG. 5 illustrates the NOx conversion rate in the rich atmosphere for the catalysts of Example 4 and Comparative Examples 7, 8.

TABLE 3

| | Upstream portion | | | Downstream portion | | | | |
| --- | --- | --- | --- | --- | --- | --- | --- | --- |
| | | | | | | | $Al_2O_3$ | ZC |
| | Used material | Material composition | Coat amount (g/L) | Used material | Material Composition | Coat amount (g/L) | weight proportion (%) | weight proportion (%) |
| Example 4 | Material 3 | $Pt/Al_2O_3$ | 20 | Material 6 | Particle size-controlled Rh/ZY | 50 | 27 | 32 |
| | Material 9 | ZC | 30 | Material 1 | $Al_2O_3$ | 35 | | |
| | | | | Material 9 | ZC | 40 | | |
| Example 5 | Material 3 | $Pt/Al_2O_3$ | 20 | Material 6 | Particle size-controlled Rh/ZY | 50 | 46 | 12 |
| | Material 9 | ZC | 30 | Material 1 | $Al_2O_3$ | 60 | | |
| | | | | Material 9 | ZC | 15 | | |
| Example 6 | Material 3 | $Pt/Al_2O_3$ | 20 | Material 6 | Particle size-controlled Rh/ZY | 50 | 15 | 44 |
| | Material 9 | ZC | 30 | Material 1 | $Al_2O_3$ | 20 | | |
| | | | | Material 9 | ZC | 55 | | |
| Comparative Example 7 | Material 3 | $Pt/Al_2O_3$ | 20 | Material 5 | Rh/ZY | 50 | 27 | 32 |
| | Material 9 | ZC | 30 | Material 1 | $Al_2O_3$ | 40 | | |
| | | | | Material 9 | ZC | 35 | | |
| Comparative Example 8 | Material 3 | $Pt/Al_2O_3$ | 20 | Material 8 | Beaker method Rh/ZY | 50 | 27 | 32 |
| | Material 9 | ZC | 30 | Material 1 | $Al_2O_3$ | 40 | | |
| | | | | Material 9 | ZC | 35 | | |
| Comparative Example 9 | Material 3 | $Pt/Al_2O_3$ | 20 | Material 5 | Rh/ZY | 50 | 46 | 12 |
| | Material 9 | ZC | 30 | Material 1 | $Al_2O_3$ | 60 | | |
| | | | | Material 9 | ZC | 15 | | |
| Comparative Example 10 | Material 3 | $Pt/Al_2O_3$ | 20 | Material 5 | Rh/ZY | 50 | 15 | 44 |
| | Material 9 | ZC | 30 | Material 1 | $Al_2O_3$ | 20 | | |
| | | | | Material 9 | ZC | 55 | | |

TABLE 4

|  | Rh fine particles | Rh fine particles Average particle size (nm) | Rb fine particles Standard deviation σ (nm) |
|---|---|---|---|
| Example 4 | Material 6 | 1.40 | 0.48 |
| Comparative Example 7 | Material 5 | 0.70 | — |
| Comparative Example 8 | Material 8 | 1.42 | 0.94 |

As illustrated in FIG. 5, it was shown that the NOx conversion rate was also significantly increased by controlling the average particle size and the standard deviation σ of the particle size of the Rh fine particles to the predetermined ranges of the present disclosure when the weight proportion of the OSC material in the downstream portion was constant.

Figure 6:
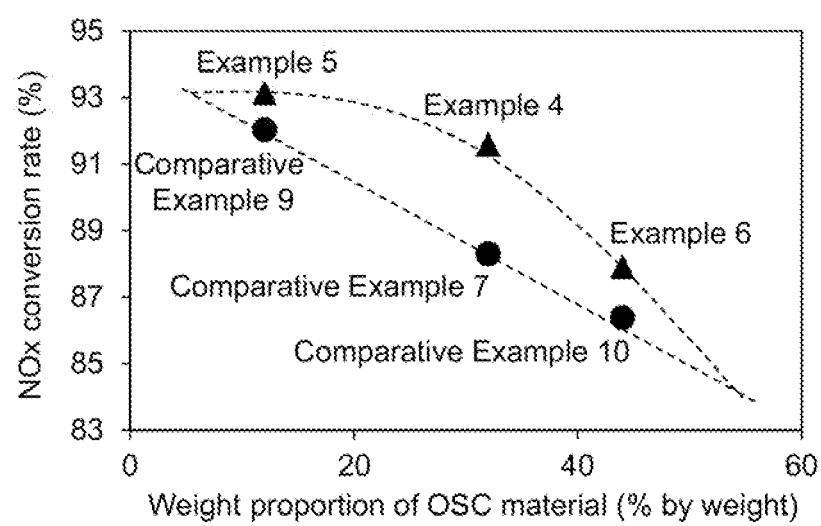
FIG. 6 is a graph illustrating a relation between a weight proportion of an OSC material of the downstream portion and the NOx conversion rate in the rich atmosphere.

FIG. 6 illustrates a relation between the weight proportion of the OSC material in the downstream portion and the NOx conversion rate in the rich atmosphere. As illustrated in FIG. 6, the NOx conversion rates of the catalysts of the Examples, in which the particle size-controlled Rh fine particles were used, were significantly high compared with the catalysts of the Comparative Examples, whose average particle sizes of the Rh fine particles were out of the predetermined range of the present disclosure, when the weight proportion of the OSC material in the downstream portion was in the range of 5% by weight or more to 55% by weight or less. The influence of the weight proportion of the OSC material in the downstream portion on the NOx conversion rate is considered as follows. Specifically, since the aggregation of the Rh fine particles is suppressed after the durability test, the particle sizes of the particle size-controlled Rh fine particles becomes smaller than that of the Comparative Examples. Accordingly, the number of active spots of Rh increases, but in contrast to this, the interaction with the OSC material increases, thereby easily inactivating Rh. Therefore, when the weight proportion of the OSC material is high, for example, exceeding 55% by weight, the contribution of the particle size-controlled Rh fine particles to the improvement of the NOx purification ability is considered to be decreased. Meanwhile, when the weight proportion of the OSC material is low, for example, less than 5% by weight, the proportion of the OSC material having the strong interaction with Rh decreases to less likely to cause the inactivation of Rh, thus improving the NOx conversion rate. However, in this case, since Rh is less likely to be inactivated also in the catalysts of the Comparative Examples, the effects compared to the catalysts of the Comparative Examples are considered to be reduced.

All publications, patents, and patent applications cited herein are incorporated herein by reference in their entirety.

DESCRIPTION OF SYMBOLS

10 Exhaust gas purification catalyst
11 Substrate
12 Upstream portion
13 Downstream portion
14 Catalyst coat layer
20 Exhaust gas purification catalyst
21 Substrate
22 Upstream portion
23 Downstream portion
24 Catalyst coat layer

What is claimed is:

1. An exhaust gas purification catalyst comprising:
a substrate; and
a catalyst coat layer formed on the substrate, the catalyst coat layer having a two-layer structure,
wherein the catalyst coat layer includes an upstream portion on an upstream side and a downstream portion on a downstream side in an exhaust gas flow direction, and a part or all of the upstream portion is formed on a part of the downstream portion,
wherein the downstream portion contains Rh fine particles, and
wherein the Rh fine particles have an average particle size measured by a transmission electron microscope observation of 1.0 nm or more to 2.0 nm or less, and a standard deviation σ of the particle size of 0.8 nm or less.

2. The exhaust gas purification catalyst according to claim 1,
wherein a content of the Rh fine particles in the downstream portion is 0.01 g/L or more to 0.7 g/L or less based on a volume of the substrate.

3. The exhaust gas purification catalyst according to claim 1,
wherein the downstream portion further contains an OSC material that has an oxygen storage capacity, and a weight proportion of the OSC material in the downstream portion is 5% by weight or more to 55% by weight or less.

4. The exhaust gas purification catalyst according to claim 1,
wherein the upstream portion contains Pt as a catalyst metal.

* * * * *